(12) United States Patent
Kim et al.

(10) Patent No.: US 11,615,290 B2
(45) Date of Patent: Mar. 28, 2023

(54) SYNTHETIC DATA GENERATION APPARATUS BASED ON GENERATIVE ADVERSARIAL NETWORKS AND LEARNING METHOD THEREOF

(71) Applicant: SAMSUNG SDS CO., LTD., Seoul (KR)

(72) Inventors: Byoung Jip Kim, Seoul (KR); Young June Gwon, Seoul (KR); Yong Hyun Jeong, Seoul (KR); Yeong Dae Kwon, Seoul (KR); Chang Hyeon Bae, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 386 days.

(21) Appl. No.: 16/885,006

(22) Filed: May 27, 2020

(65) Prior Publication Data

US 2021/0357728 A1 Nov. 18, 2021

(30) Foreign Application Priority Data

May 15, 2020 (KR) .................. 10-2020-0058088

(51) Int. Cl.
| | |
|---|---|
| *G06N 3/04* | (2023.01) |
| *G06N 3/08* | (2023.01) |
| *G01V 1/28* | (2006.01) |
| *G06N 3/088* | (2023.01) |

(52) U.S. Cl.
CPC .......... *G06N 3/0454* (2013.01); *G06N 3/088* (2013.01); *G01V 1/282* (2013.01); *G06N 3/04* (2013.01)

(58) Field of Classification Search
CPC ........ G06N 3/0454; G06N 3/088; G06N 3/04; G06N 3/0472; G06N 3/08; G01V 1/282
See application file for complete search history.

(56) References Cited

U.S. PATENT DOCUMENTS

2019/0244138 A1* 8/2019 Bhowmick ............. H04L 67/10
2021/0312064 A1* 10/2021 Arthur ................ G06F 21/6254

OTHER PUBLICATIONS

Torkzadehmahani et al, (DP-CGAN : Differentially Private Synthetic Data and Label Generation, Jan. 2020, IEEE). (Year: 2020).*
B) Nikolenko (Synthetic Data for Deep Learning, 2019). (Year: 2019).*
European Search Report for EP20194759.5 dated Mar. 25, 2021 from European patent office in a counterpart European patent application.

(Continued)

*Primary Examiner* — Mohammad K Islam
(74) *Attorney, Agent, or Firm* — The PL Law Group, PLLC

(57) ABSTRACT

A synthetic data generation apparatus according to an embodiment includes a generator for generating synthetic data from an input value, a first discriminator learned to distinguish between actual data and the synthetic data, a second discriminator learned to distinguish between the actual data and the synthetic data while satisfying differential privacy, and a third discriminator learned to distinguish between first synthetic data which is output from the generator learned by the first discriminator and second synthetic data which is output from the generator learned by the second discriminator.

7 Claims, 5 Drawing Sheets

(56) References Cited

OTHER PUBLICATIONS

Sumit Mukherjee et al.,"Protecting GANs against privacy attacks by preventing overfitting", arxiv.org, Cornell University Library, 2010LIN Library Cornell University Ithaca, NY 14853, 2019.
Liyang Xie et al., "Differntially Private Generative Adversarial Network", arxiv.org, Cornell University Library, 2010LIN Library Cornell University Ithaca, NY 14853, 2018.
Yunhui Long et al., "Scalable Differentially Private Generative Student Model via PATE", arxiv.org, Cornell University Library, 2010LIN Library Cornell University Ithaca, NY 14853, 2019.
Xingyuan Chen et al., "A Discriminator Improves Unconditional Text Generation without Updating the Generator", arxiv.org, Cornell University Library, 2010LIN Library Cornell University Ithaca, NY 14853, 2020.

* cited by examiner

SYNTHETIC DATA GENERATION APPARATUS BASED ON GENERATIVE ADVERSARIAL NETWORKS AND LEARNING METHOD THEREOF

CROSS REFERENCE TO RELATED APPLICATIONS AND CLAIM OF PRIORITY

This application claims the benefit of Korean Patent Application No. 10-2020-0058088 filed on May 15, 2020 in the Korean Intellectual Property Office, the disclosure of which is incorporated herein by reference in its entirety.

TECHNICAL FIELD

Embodiments disclosed herein relate to a technology for generating synthetic data with guaranteed differential privacy (DP) using a generative adversarial network (GAN).

BACKGROUND ART OF THE INVENTION

A generative adversarial network (GAN) is a type of a generative model using a deep neural network. The generative model is a model capable of estimating the distribution of a given data set, and can sample or generate data using the estimated distribution. The GAN is composed of two deep neural networks, that is, a generator and a discriminator. The generator serves to generate data from a random noise, and the discriminator serves to distinguish whether given data is generated data or actual data. Learning is achieved while the generator and the discriminator compete with each other as in a two-player game. The generator is learned to generate fake data which is indistinguishable from the actual data, and the discriminator is leaned to better distinguish between the generated data and the actual data. When two competitive (or adversary) deep neural networks reach equilibrium, learning is terminated. After the learning is completed, the generator will be able to generate data that is indistinguishable from the actual data.

Meanwhile, the differential privacy (DP) is a framework capable of measuring to what extent an analysis algorithm may protect privacy in a mathematically verifiable way. When DP is applied to an analysis algorithm, it is possible to perform quantification to what extent an analysis result protect privacy. Existing anonymization methods were privacy protection methods centered on input data, but DP is a method for finally protecting privacy by applying appropriate processing to an analysis algorithm.

The use of DP makes it possible to more safely design a machine learning model which is leaned by using sensitive personal information. Accordingly, various methods have been proposed to implement privacy-preserving machine learning. However, the privacy guarantee by DP and the performance of a machine learning algorithm to which DP is applied are in a trade-off relationship. Therefore, there is a need for a method capable of reducing the performance deterioration of a machine learning model while satisfying DP.

SUMMARY

Embodiments disclosed herein provide a method for precisely reproducing actual data while an algorithm generating synthetic data using a GAN satisfies differential privacy.

According to an exemplary embodiment, provided is a synthetic data generation apparatus including a generator configured to generate synthetic data from an input value, a first discriminator learned to distinguish between actual data and the synthetic data, a second discriminator learned to distinguish between the actual data and the synthetic data while satisfying differential privacy, and a third discriminator learned to distinguish between first synthetic data which is output from the generator learned by the first discriminator and second synthetic data which is output from the generator learned by the second discriminator.

The second delimiter may be leaned to distinguish between the actual data and the synthetic data while satisfying the differential privacy using any one algorithm of DP-GAN and PATE-GAN.

The generator may be sequentially leaned by the first discriminator, the second discriminator, and the third discriminator.

According to another exemplary embodiment, provided is a machine learning method that is performed in a computing device including one or more processors and a memory storing one or more programs executed by the one or more processors, wherein the method includes learning a first discriminator to distinguish between actual data and synthetic data generated from a generator, primarily learning the generator using the learned first discriminator, learning a second discriminator to distinguish between the actual data the synthetic data while satisfying differential privacy, secondarily learning the generator using the learned second discriminator, learning a third discriminator to distinguish between first synthetic data which is output from the generator learned in the primary learning and second synthetic data which is output from the generator learned in the secondary learning, and tertiarily learning the generator using the learned third discriminator.

The learning of the second discriminator may perform learning to distinguish between the actual data and the synthetic data while satisfying the differential privacy using any one algorithm of DP-GAN and PATE-GAN.

According to yet another exemplary embodiment, provided is a computing device comprising one or more processors, a memory, and one or more programs stored in the memory and executed by the one or more processors, wherein the one or more programs includes instructions for performing steps comprising learning a first discriminator to distinguish between actual data and synthetic data generated from a generator, primarily learning the generator using the learned first discriminator, learning a second discriminator to distinguish between the actual data the synthetic data while satisfying differential privacy, secondarily learning the generator using the learned second discriminator, learning a third discriminator to distinguish between first synthetic data which is output from the generator learned in the primary learning and second synthetic data which is output from the generator learned in the secondary learning, and tertiarily learning the generator using the learned third discriminator.

The learning of the second discriminator may perform learning to distinguish between the actual data and the synthetic data while satisfying the differential privacy using any one algorithm of DP-GAN and PATE-GAN.

According to the disclosed embodiments, by sequentially performing learning of a GAN using three discriminators playing different roles, it is possible to generate sophisticated synthetic data following statistical characteristics of actual data while satisfying differential privacy.

DETAILED DESCRIPTION

Hereinafter, specific embodiments of the present invention will be described with reference to the accompanying drawings. The following detailed description is provided to aid in a comprehensive understanding of a method, a device and/or a system described in the present specification. However, the detailed description is only for illustrative purpose and the present invention is not limited thereto.

In describing the embodiments of the present invention, when it is determined that a detailed description of known technology related to the present invention may unnecessarily obscure the gist of the present invention, the detailed description thereof will be omitted. In addition, terms to be described later are terms defined in consideration of functions in the present invention, which may vary depending on intention or custom of a user or operator. Therefore, the definition of these terms should be made based on the contents throughout this specification. The terms used in the detailed description are only for describing the embodiments of the present invention and should not be used in a limiting sense. Unless expressly used otherwise, a singular form includes a plural form. In this description, expressions such as "including" or "comprising" are intended to indicate any property, number, step, element, and some or combinations thereof, and such expressions should not be interpreted to exclude the presence or possibility of one or more other properties, numbers, steps, elements other than those described, and some or combinations thereof.

Figure 1:
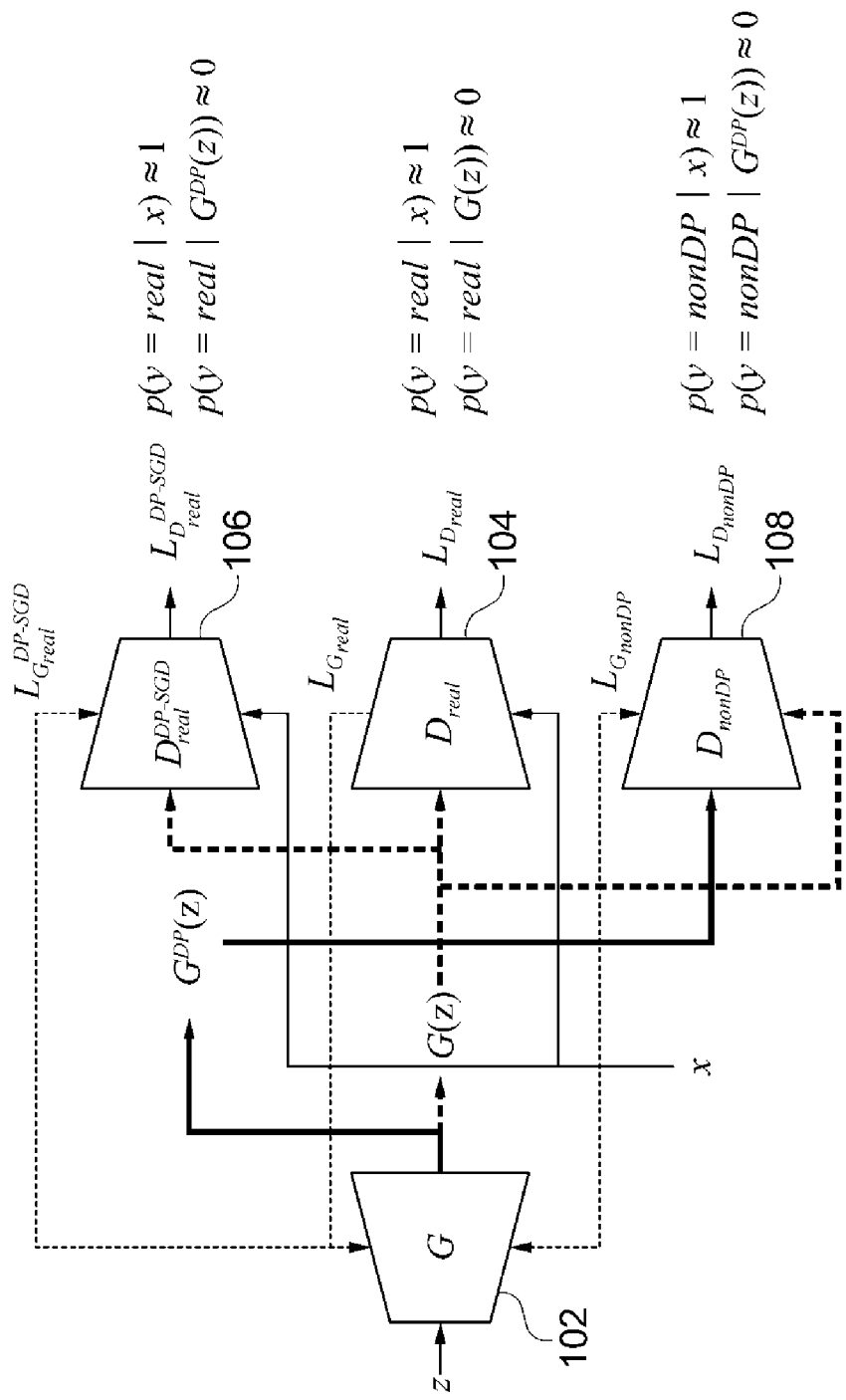
FIG. 1 is a block diagram illustrating a synthetic data generation apparatus based on generative adversarial networks according to an embodiment of the present invention.

FIG. 1 is a block diagram illustrating a synthetic data generation apparatus 100 based on generative adversarial networks according to an embodiment of the present invention. The synthetic data generation apparatus 100 according to embodiments disclosed herein includes a machine learning model structure for generating sophisticated synthetic data which follows the statistical characteristics of real data while satisfying differential privacy (DP) using Generative hostile neural networks (GAN). Differential privacy (DP) is a framework capable of mathematically quantifying to what extent an analysis algorithm may protect privacy. When a machine learning algorithm satisfying DP, it is possible to quantitatively reduce the risk of sensitive personal information being exposed by an adversary attacker. However, since an example is based on probability randomness, the privacy guarantee by DP and the performance of a machine learning algorithm to which DP is applied are in a trade-off relationship. Therefore, there is a need for a method capable of reducing possible performance deterioration while satisfying DP.

To this end, the synthetic data generation apparatus 100 according to the embodiments disclosed herein is configured to include three discriminators including one generator 102, a first discriminator 104, a second discriminator 106, and a third discriminator 108.

The generator 102 generates synthetic data G(z) which is similar to actual data x from an input value z. At this time, the input value z may be a random number.

The first discriminator 104 is learned to distinguish between the synthetic data G(z) generated from the generator 102 and the actual data x. Through the first discriminator 104, the generator 102 may be leaned to generate the synthetic data G(z) which is similar to the actual data x.

The second discriminator 106 is learned to distinguish between the actual data x and the synthetic data G(z) while satisfying differential privacy. Through the second discriminator 106, the generator 102 may be leaned to generate synthetic data $G^{DP}(z)$ satisfying the differential privacy.

In the embodiments disclosed herein, the second separator 106 may perform learning by applying one of various algorithms for satisfying the differential privacy. The algorithm may include, for example, Differentially Private Adversarial Networks (DP-GAN), Private Aggregation of Teacher Ensembles (PATE-GAN), or the like. However, the embodiments disclosed herein are not limited to a specific algorithm.

The third discriminator 108 is learned to distinguish between the synthetic data G(z) output from the generator 102 learned by the first discriminator 104 and the synthetic data $G^{DP}(z)$ output from the generator 102 learned by the second discriminator 106. Through the third discriminator 108, the generator 102 may be learned to generate sophisticated synthetic data which is hard to be distinguished from the actual data x while satisfying the differential privacy.

In an embodiment, the generator 102 may be sequentially learned by the first discriminator 104, the second discriminator 106, and the third discriminator 108.

Figure 2:
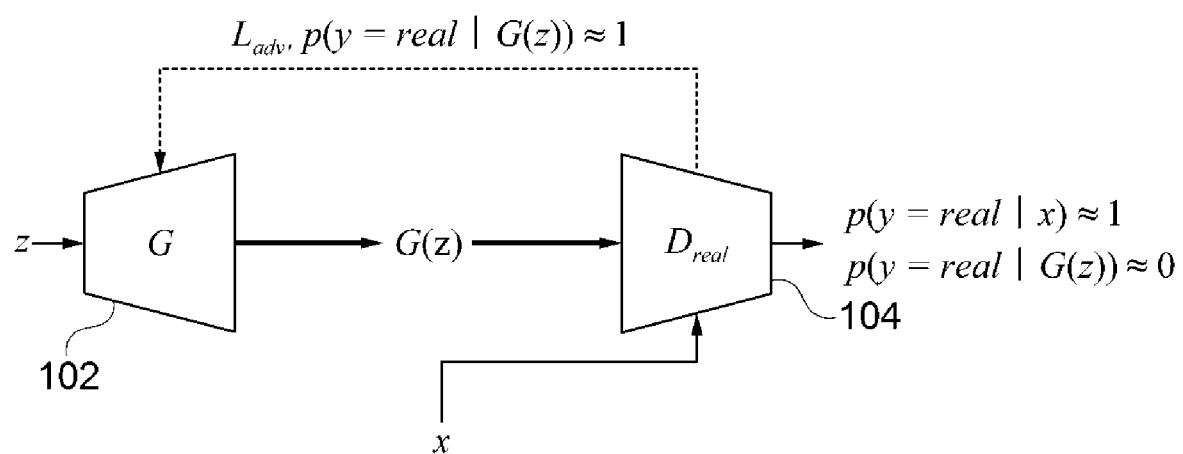
FIG. 2 is an exemplary diagram illustrating a learning process between a generator and a first discriminator according to an embodiment of the present invention.

FIG. 2 is an exemplary diagram illustrating a learning process between the generator 102 and the first discriminator 104 according to an embodiment of the present invention. In the illustrated exemplary diagram, the first discriminator 104 is learned to distinguish between the synthetic data G(z) generated from the generator 102 and the actual data x, thereby outputting 1 when it is the actual data x and outputting 0 when it is the actual data G(z). The generator 102 is learned such that the first discriminator 104 generates the sophisticated synthetic data G(z) which is indistinguishable from the actual data x. In other words, the generator 102 is learned such that the first discriminator 104 receives the synthetic data G(z) and determines the same as the actual data to output 1. The following Equation 1 represents minimax optimization for generating synthetic data similar to actual data.

$$\min_{G, D_{real}} \max V(G, D_{real}) = \quad [\text{Equation 1}]$$

$$\mathbb{E}_{x \sim p(x)}[\log(D_{real}(x))] + \mathbb{E}_{z \sim p(z)}[\log(1 - D_{real}(G(z)))]$$

$$\mathcal{L}_{D_{real}} = -\mathbb{E}_{x \sim p(x)}[\log(D_{real}(x))] - \mathbb{E}_{z \sim p(z)}[\log(1 - D_{real}(G(z)))]$$

$$\mathcal{L}_{G_{real}} = \mathbb{E}_{z \sim p(z)}[\log(1 - D_{real}(G(z)))]$$

In the above equation, G is the generator 102, $D_{real}$ is the first discriminator 104, x is actual data, z is a random number, G(x) is synthetic data, $\mathcal{L}_{D_{real}}$ and $\mathcal{L}_{G_{real}}$ are respectively a loss function of the first discriminator 104 and the generator 102.

Although not illustrated, learning between the generator 102 and the second discriminator 106 and learning between the generator 102 and the third discriminator 108 are also performed through a similar process.

In a learning process between the generator 102 and the second discriminator 106, the second discriminator 106 is learned to distinguish, while satisfying differential privacy, between the synthetic data G(z) generated from the generator 102 and the actual data x, thereby outputting 1 when it is the actual data x and outputting 0 when it is the actual data G(z). For example, the second discriminator 106 may be learned to satisfy differential privacy through a method in which an output value adds a random noise, and the like.

The generator 102 is learned such that the second discriminator 106 generates the synthetic data $G^{DP}(z)$ satisfying differential privacy. In other words, the generator 102 is learned such that the second discriminator 106 receives the synthetic data $G^{DP}(z)$ and determines the same as the actual data to output 1. The following Equation 2 represents minimax optimization for generating synthetic data satisfying differential privacy.

$$\min\max_{G,D_{real}^{DP}} V(G, D_{real}^{DP})$$
$$= \mathbb{E}_{x\sim p(x)}[\log(D_{real}^{DP}(x))] - \mathbb{E}_{z\sim p(z)}[\log(1-D_{real}^{DP}(G(z)))]$$

$$\mathcal{L}_{D_{real}^{DP}\text{-}SGD} = -\mathbb{E}_{x\sim p(x)}[\log(D_{real}^{DP}(x))] - \mathbb{E}_{z\sim p(z)}[\log(1-D_{real}^{DP}(G(z)))]$$

$$\mathcal{L}_{G_{real}^{DP}\text{-}SGD} = \mathbb{E}_{z\sim p(z)}[\log(1-D_{real}^{DP}(G(z)))] \quad \text{[Equation 2]}$$

In the above equation, G is the generator 102, $D_{real}^{DP}$ is the second discriminator 106, x is actual data, z is a random number, $D_{real}^{DP}$ is synthetic data satisfying differential privacy, $\mathcal{L}_{D_{real}^{DP}\text{-}SGD}$ and $\mathcal{L}_{G_{real}^{DP}\text{-}SGD}$ are respectively a loss function of the second discriminator 106 and the generator 102.

In a learning process between the generator 102 and the third discriminator 108, the third discriminator 108 is learned to distinguish between first synthetic data G(z) learned by the first discriminator 104 and second synthetic data $G^{DP}(z)$ learned by the second discriminator 106, thereby outputting 1 when it is the first synthetic data G(z) and outputting 0 when it is the second synthetic data $G^{DP}(z)$.

The generator 102 is learned to generate the second synthetic data $G^P(z)$ which is indistinguishable by the third discriminator 106. In other words, the generator 102 is learned such that the third discriminator 106 receives the second synthetic data $G^{DP}(z)$ and determines the same as the first synthetic data G(z) to output 1. The following Equation 3 represents minimax optimization for generating synthetic data similar to the distribution of actual data while satisfying differential privacy.

$$\min\max_{G,D_{nonDP}} V(G, D_{nonDP})$$
$$= \mathbb{E}_{z\sim p(z)}[\log(D_{nonDP}(G(z)))] - \mathbb{E}_{z\sim p(z)}[\log(1-D_{nonDP}(G^{DP}(z)))]$$

$$\mathcal{L}_{D_{nonDP}} = -\mathbb{E}_{z\sim p(z)}[\log(D_{nonDP}(G(z)))] - \mathbb{E}_{z\sim p(z)}[\log(1-D_{nonDP}(G^{DP}(z)))]$$

$$\mathcal{L}_{G_{nonDP}} = \mathbb{E}_{z\sim p(z)}[\log(1-D_{nonDP}(G^{DP}(z)))] \quad \text{[Equation 3]}$$

In the above equation, G is the generator 102, $D_{nonDP}$ is the third discriminator 108, G(z) is first synthetic data, z is a random number, $G^{DP}$ is second synthetic data, $\mathcal{L}_{D_{nonDP}}$ and $\mathcal{L}_{G_{nonDP}}$ are respectively a loss function of the third discriminator 108 and the generator 102.

When three minimax optimizations illustrated in Equations 1 to 3 above reach equilibrium, learning is terminated.

Figure 3:
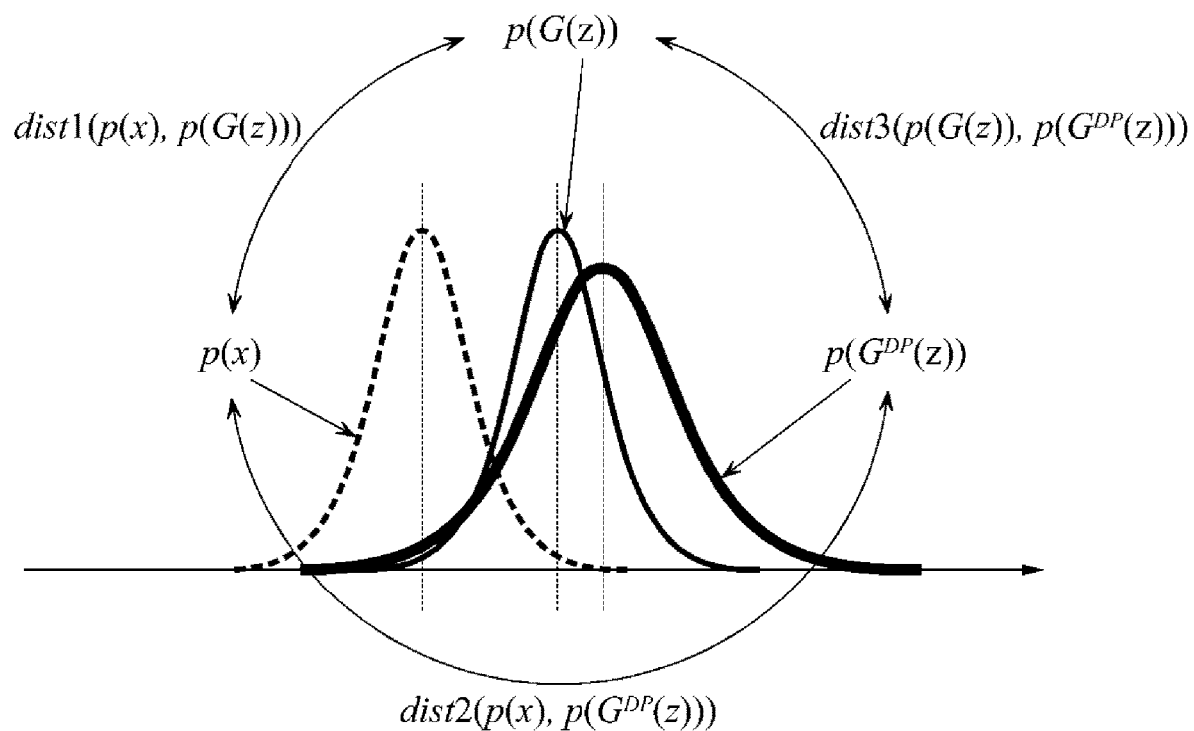
FIG. 3 is a graph illustrating the distribution of data in accordance with a learning process according to an embodiment of the present invention.

FIG. 3 is a graph illustrating the distribution of data in accordance with a learning process according to an embodiment of the present invention. In the illustrated graph, p(x) represented as a dotted line is the distribution of the actual data x, p(G(z)) is the distribution of synthetic data G(z) learned by the first separator 104, $p(G^{DP}(z))$ is the distribution of synthetic data $G^{DP}(z)$ with guaranteed DP learned by the second separator 106, respectively.

The generator 102 may be learned to minimize the difference dist1(p(x), p(G(z))) between the distribution of the actual data and the distribution of the synthetic data through learning with the first discriminator 104. Next, the generator 102 may be learned to minimize the difference dist2(p(x), $p(G^{DP}(z))$) between the distribution of the actual data and the distribution of the synthetic data through learning with the second discriminator 106 while satisfying differential privacy. Lastly, the generator 102 may be learned to minimize the difference dist3(p(G(z)), $p(G^{DP}(z))$) between the distribution of learning results G(z) by the first discriminator 104 and the distribution of learning results $G^{DP}(z)$ by the second discriminator 106 through learning with the third discriminator 108. Through the above process, the generator 102 may be learned to generate sophisticated synthetic data which is hard to be distinguished from the actual data x while satisfying the differential privacy.

Figure 4:
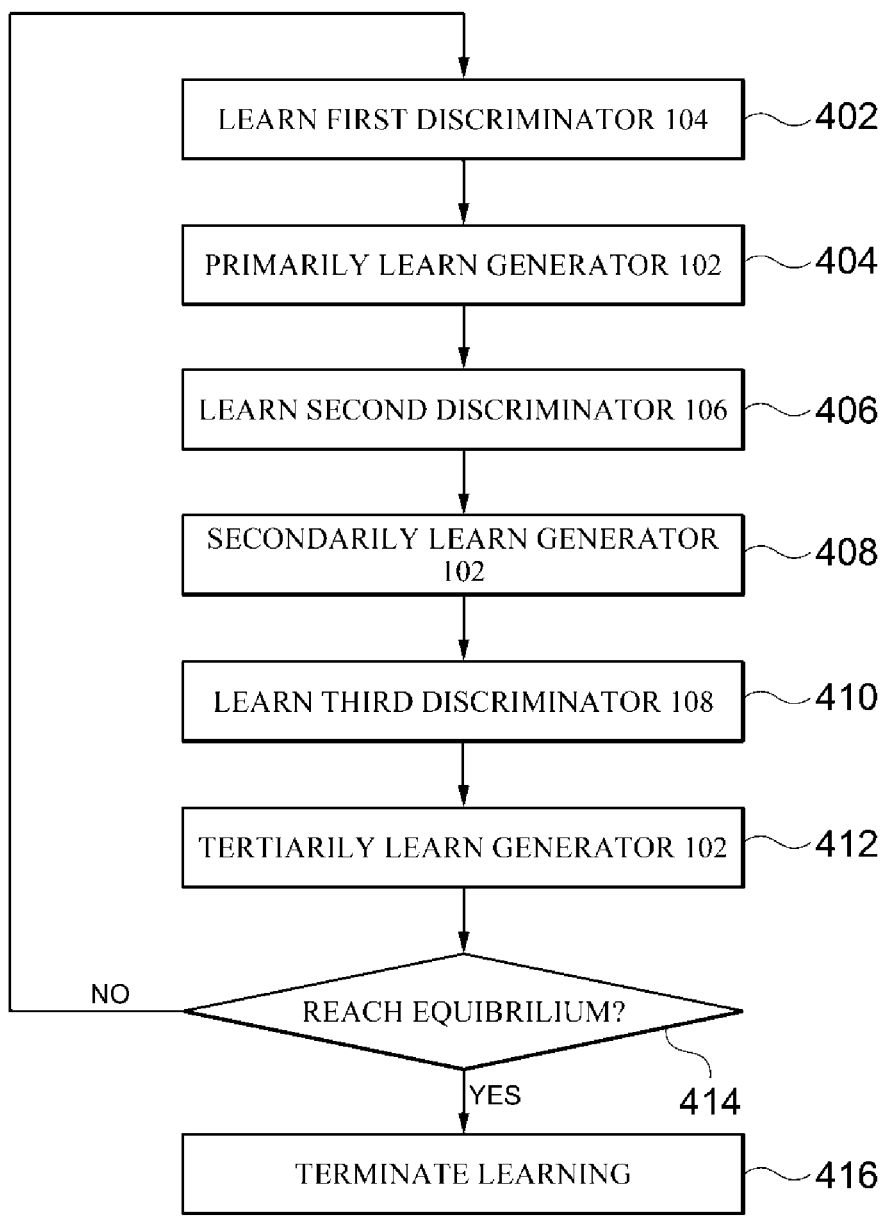
FIG. 4 is a flow chart illustrating a learning method of generative adversarial networks, the method according to an embodiment of the present invention.

FIG. 4 is a flow chart illustrating a learning method 400 of generative adversarial networks, the method according to an embodiment of the present invention. The illustrated flowchart may be performed by a computing device, for example, the synthetic data generation apparatus 100, which is provided with one or more processors and a memory for storing one or more programs executed by the one or more processors. In the illustrated flowchart, the method or process is disclosed by being divided into a plurality of steps. However, at least some of the steps may be performed in a different order, performed by being combined with other steps, omitted, performed by being divided into detailed steps, or performed by being added with one or more steps not illustrated.

In Step 402, the synthetic data generation apparatus 100 learns the first discriminator 104 to distinguish between the actual data x and the synthetic data G(z) generated from the generator 102.

In Step 404, the synthetic data generation apparatus 100 primarily learns the generator 102 using the learned first discriminator 104. Through the above process, the generator 102 may be leaned to generate the synthetic data G(z) which has a distribution similar to that of the actual data x.

In Step 406, the synthetic data generation apparatus 100 learns the second discriminator 106 to distinguish between the actual data x and the synthetic data G(z) while satisfying differential privacy.

In Step 408, the synthetic data generation apparatus 100 secondarily learns the generator 102 using the learned second discriminator 106. Through the above process, the generator 102 may be leaned to generate synthetic data $G^{DP}(z)$ satisfying the differential privacy.

In Step 410, the synthetic data generation apparatus 100 learns the third discriminator 108 to distinguish between the first synthetic data G(z) output from the generator 102 learned in Step 404 and the second synthetic data $G^{DP}(z)$ output from the generator 102 learned in Step 408. For the learning of the present step, the synthetic data generation apparatus 100 may obtain and store a plurality of the first synthetic data G(z) from the generator 102 after Step 404 is performed.

In Step 412, the synthetic data generation apparatus 100 tertiarily learns the generator 102 using the learned third discriminator 108. Through the above process, the generator 102 may be learned to generate sophisticated synthetic data which has a distribution similar to that of actual data while satisfying differential privacy.

Figure 5:
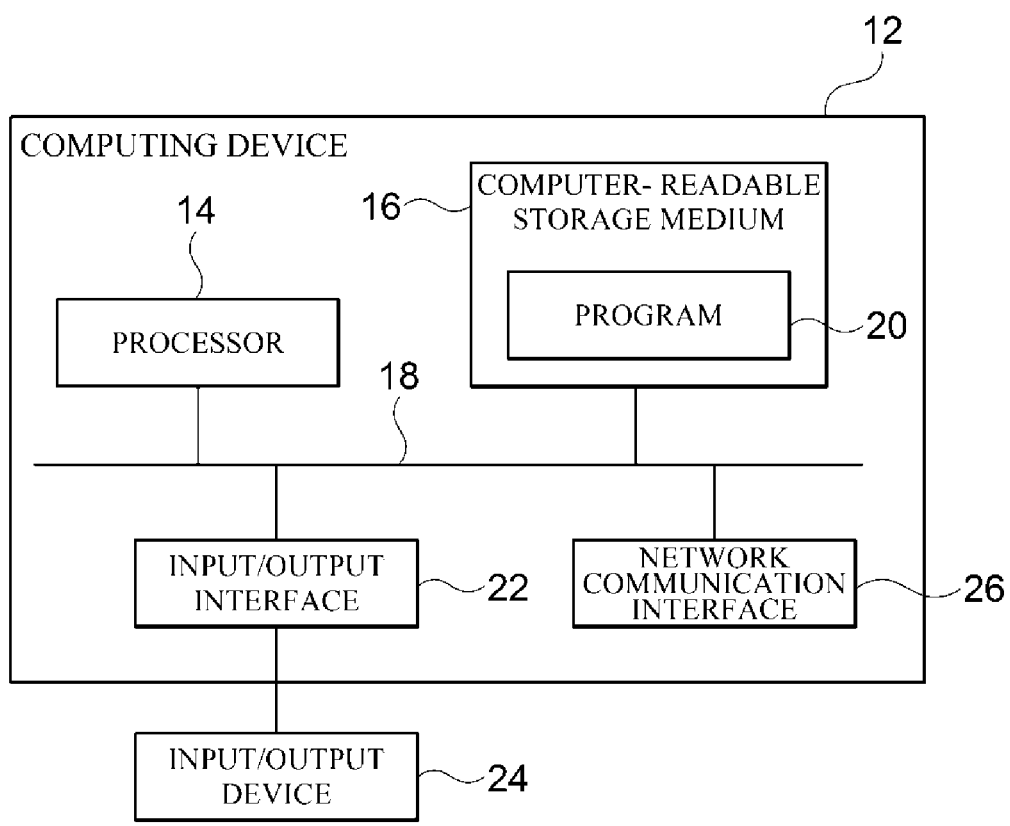
FIG. 5 is a block diagram exemplarily illustrating a computing environment including a computing device suitable for used in exemplary embodiments.

FIG. 5 is a block diagram exemplarily illustrating a computing environment 10 that includes a computing device suitable for use in the exemplary embodiment. In the illustrated embodiment, each component may have different functions and capabilities in addition to those described below, and additional components may be included in addition to those described below.

The illustrated computing environment 10 includes a computing device 12. In an embodiment, the computing device 12 may be the reproduction data generating apparatus 100 according to embodiments of the present invention. The computing device 12 includes at least one processor 14, a computer-readable storage medium 16, and a communication bus 18. The processor 14 may cause the computing device 12 to perform steps according to the exemplary embodiment described above. For example, the processor 14 may execute one or more programs stored in the computer-readable storage medium 16. The one or more programs may include one or more computer-executable instructions, which, when executed by the processor 14, may be configured to cause the computing device 12 to perform steps according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory (e.g., random access memory), non-volatile memory, or any suitable combination thereof), one or more magnetic disk storage devices, optical disk storage devices, flash memory devices, other types of storage media that are accessible by the computing device 12 and store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or imaging devices, and/or output devices such as a display devices, a printer, a speaker, and/or a network card. The exemplary input/output device 24 may be included inside the computing device 12 as a component constituting the computing device 12, or may be connected to the computing device 12 as a separate device distinct from the computing device 12.

Meanwhile, an embodiment of the present invention may include a program for performing the methods described herein on a computer, and a computer-readable recording medium including the program. The computer-readable recording medium may include, alone or in combination, program instructions, local data files, local data structures, and the like. The medium may be specially designed and configured for the present invention, or may be one commonly used in the field of computer software.

Examples of computer-readable recording media include magnetic media such as hard disks, floppy disks, and magnetic tapes, optical recording media such as CD-ROMs and DVDs, and hardware devices specially configured to store and execute program instructions, such as ROMs, RAMs, flash memories, and the like. Examples of the program may include machine codes, such as those created by a compiler, as well as advanced language codes which may be executed by a computer using an interpreter and the like.

Although the exemplary embodiment of the present invention has been described in detail as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

The invention claimed is:

1. A synthetic data generation apparatus based on generative adversarial networks, the apparatus comprising:
   a generator configured to generate synthetic data from an input value;
   a first discriminator learned to distinguish between actual data and the synthetic data;
   a second discriminator learned to distinguish between the actual data and the synthetic data while satisfying differential privacy; and
   a third discriminator learned to distinguish between first synthetic data which is output from the generator learned by the first discriminator and second synthetic data which is output from the generator learned by the second discriminator.

2. The apparatus of claim 1,
   wherein the second discriminator leaned to distinguish between the actual data and the synthetic data while satisfying the differential privacy using any one algorithm of DP-GAN and PATE-GAN.

3. The apparatus of claim 1,
   wherein the generator is sequentially leaned by the first discriminator, the second discriminator, and the third discriminator.

4. A machine learning method that is performed in a computing device including one or more processors and a memory storing one or more programs executed by the one or more processors, the method comprising:
   learning a first discriminator to distinguish between actual data and synthetic data generated from a generator;
   primarily learning the generator using the learned first discriminator;
   learning a second discriminator to distinguish between the actual data the synthetic data while satisfying differential privacy;
   secondarily learning the generator using the learned second discriminator;
   learning a third discriminator to distinguish between first synthetic data which is output from the generator learned in the primary learning and second synthetic data which is output from the generator learned in the secondary learning; and
   tertiarily learning the generator using the learned third discriminator.

5. The method of claim 4,
   wherein the learning of the second discriminator performs learning to distinguish between the actual data and the synthetic data while satisfying the differential privacy using any one algorithm of DP-GAN and PATE-GAN.

6. A computing device comprising:
one or more processors;
a memory; and
one or more programs stored in the memory and executed by the one or more processors,
wherein the one or more programs include instructions for performing steps comprising:
learning a first discriminator to distinguish between actual data and synthetic data generated from a generator;
primarily learning the generator using the learned first discriminator;
learning a second discriminator to distinguish between the actual data the synthetic data while satisfying differential privacy;
secondarily learning the generator using the learned second discriminator;
learning a third discriminator to distinguish between first synthetic data which is output from the generator learned in the primary learning and second synthetic data which is output from the generator learned in the secondary learning; and
tertiarily learning the generator using the learned third discriminator.

7. The computing device of claim 6,
wherein the learning of the second discriminator performs learning to distinguish between the actual data and the synthetic data while satisfying the differential privacy using any one algorithm of DP-GAN and PATE-GAN.

* * * * *